Figure 1:
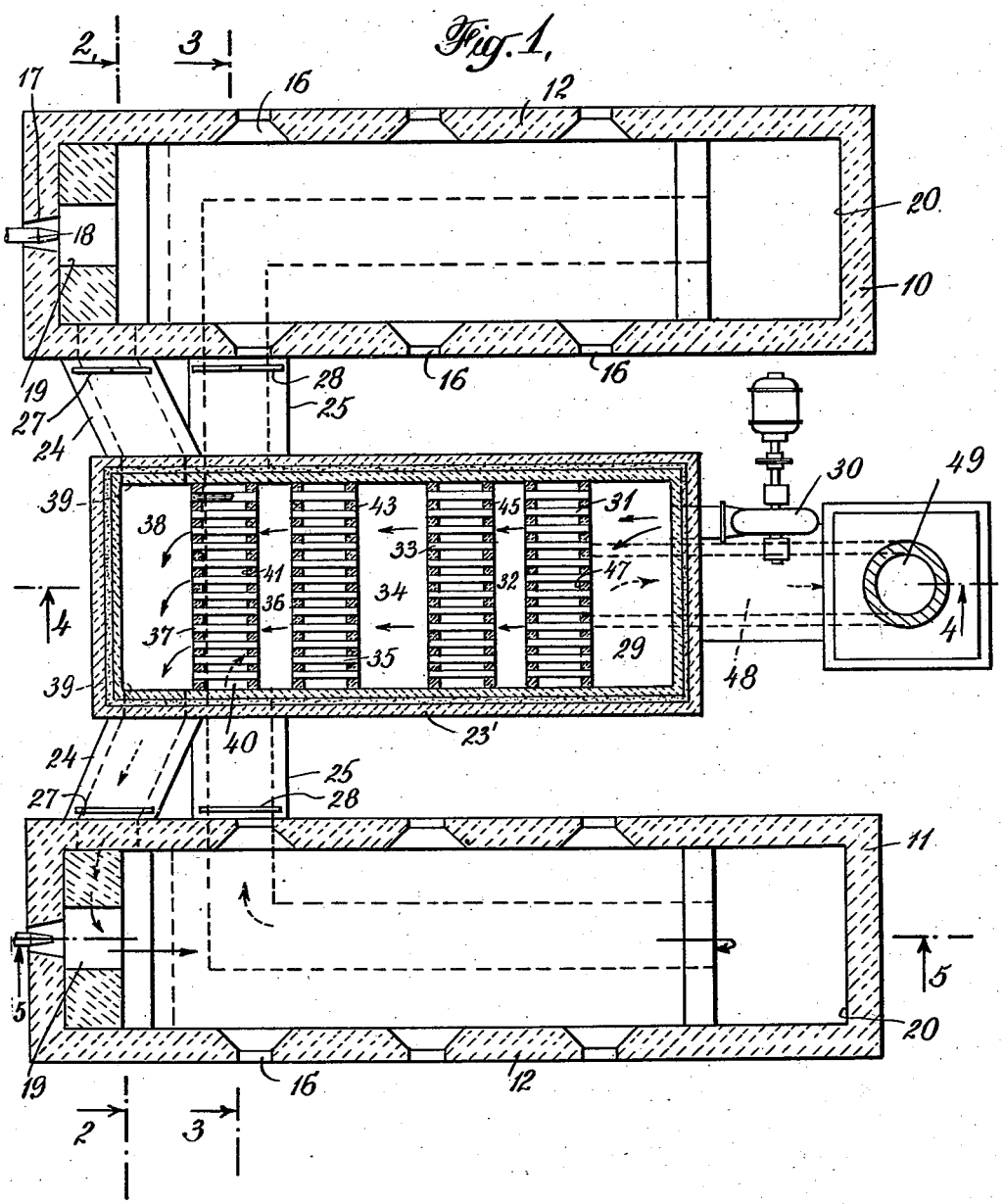

Nov. 12, 1929.    W. H. FITCH    1,735,608
HEATING FURNACE
Filed Dec. 18, 1926    3 Sheets-Sheet 1

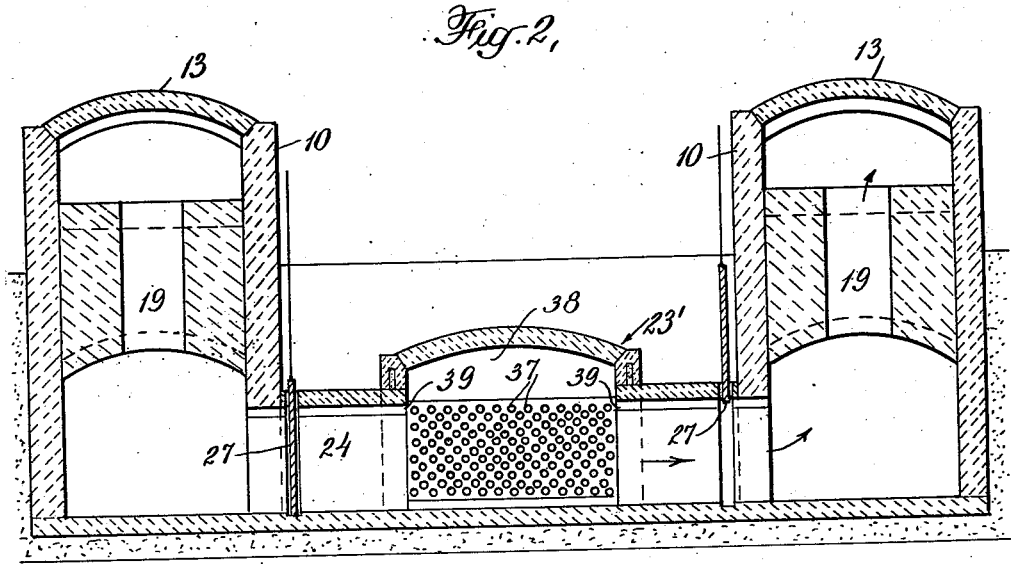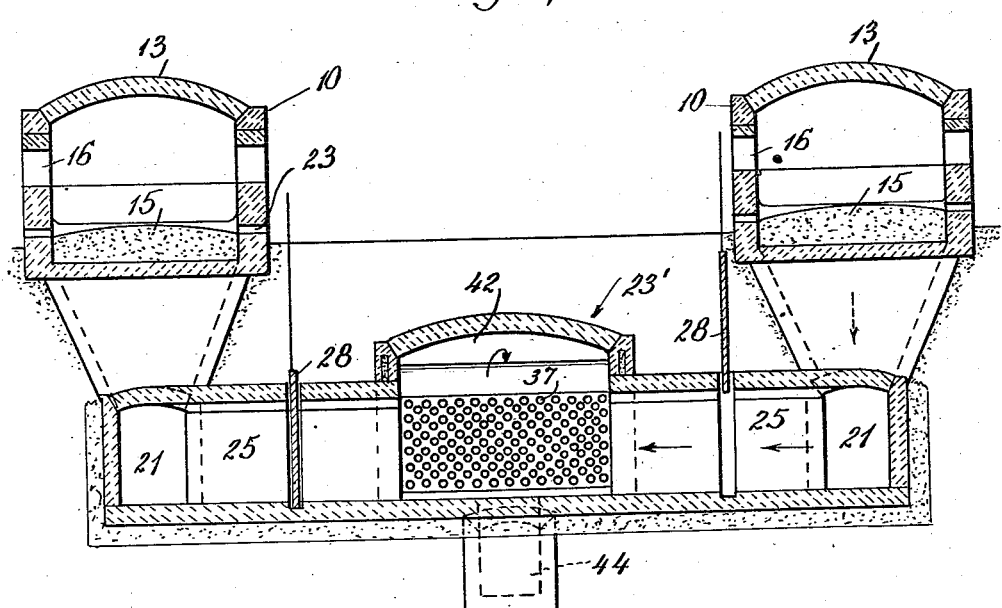

Nov. 12, 1929. W. H. FITCH 1,735,608
HEATING FURNACE
Filed Dec. 18, 1926  3 Sheets-Sheet 3
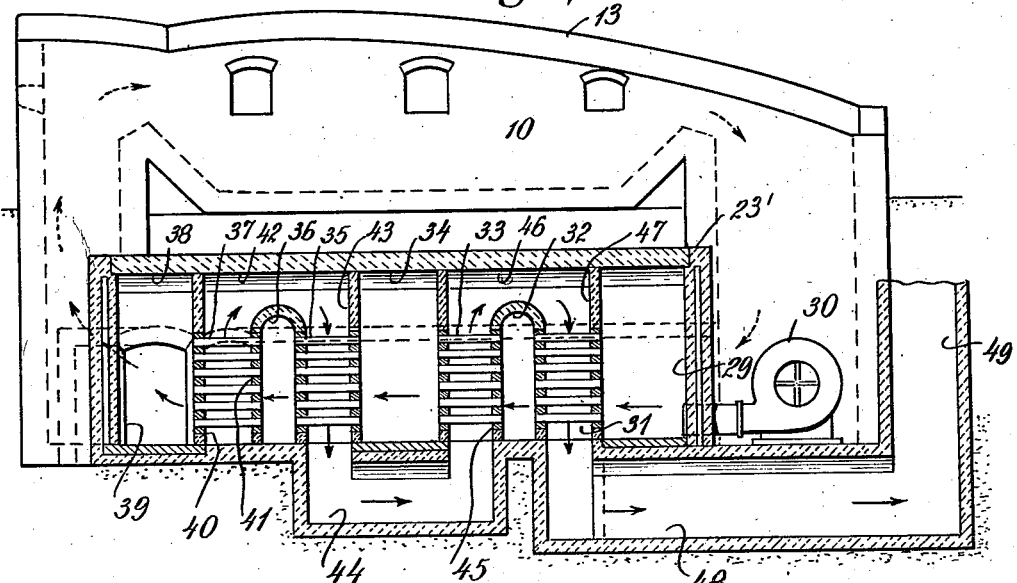
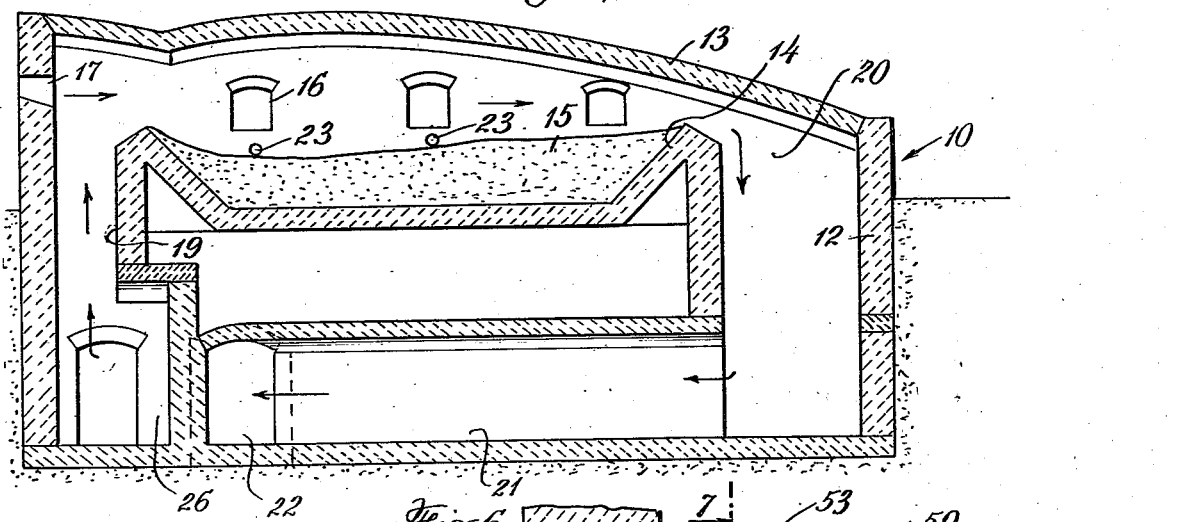
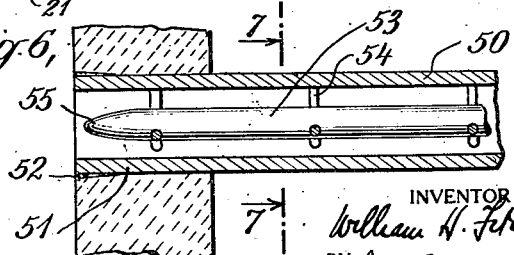
INVENTOR
William H. Fitch
BY
ATTORNEYS Patented Nov. 12, 1929

1,735,608

UNITED STATES PATENT OFFICE

WILLIAM H. FITCH, OF ALLENTOWN, PENNSYLVANIA

HEATING FURNACE

Application filed December 18, 1926. Serial No. 155,595.

This invention relates to a furnace installation including twin furnaces with a common heat recovery device, such as a recuperator, which is arranged to be used alternately with one of the furnaces while the other is idle and undergoing cleaning or repairs. A typical installation of this kind is one including two furnaces of the reverberatory type which require periodical cleaning and a single recuperator of novel construction to recover heat carried from the heating chambers by the waste gases. These furnaces may be of different kinds but an installation including twin furnaces of the so-called "air type" used for melting iron which is subsequently to be annealed, will be described for purposes of illustration, though it is to be understood that the utility of the invention is by no means limited to the purpose for which the furnaces are employed.

In furnace installations used for melting metal, the furnaces are provided with a hearth on which the metal is placed and the fuel, which may be oil, pulverized coal, gas, or the like, is fed into the furnace chamber through a burner passing through the furnace wall. The hot gases of combustion pass out through an outlet from the furnace chamber and carry with them a large amount of heat. These furnaces are commonly used in pairs and one furnace may be fired continuously for a period of days and is then necessarily shut down so that it may be repaired, cleaned, and given other attention, while the companion furnace is brought into action. In some instances each furnace is fired throughout the twenty-four hour period while it is in service for several days, but in other instances owing to the lack of floor space in the foundry or for other reasons, the furnace being fired is only used for a part of the twenty-four hour period and then remains idle until the next firing occurs.

As the waste gases from such furnaces carry away a large amount of heat, economic operation requires that the heat be recovered, and in the present instance this recovery is achieved by means of a recuperative device of novel construction which will presently be described in detail. This recuperative device is arranged so that it requires little attention and can be readily cleaned and repaired when occasion arises, although the period required for such attention is considerably less than that required for the repair and cleaning of one of the furnaces. Pulverized coal is highly satisfactory as a fuel in furnaces of this character, but the gases from a furnace chamber in which such fuel is being burned contain considerable amounts of solid material which are deposited in the outlet passages, and the present recuperator is constructed so that it may be used with a furnace in which this fuel is being fired without difficulty.

As a period of inactivity of a furnace or the recuperator represents a money loss of some consequence, it is important that each structure should be used to the maximum extent and by reason of the ease and rapidity with which the present recuperative device may be cleaned and otherwise kept in condition for service, a single recuperator may be used with twin furnaces which are fired in alternation. In such an installation as constructed in accordance with this invention the losses resulting from periods of inactivity are greatly reduced and although one furnace is lying idle while the other is in operation, the recuperator may be used with either furnace for long periods without having to be put out of service, and when inspection and repair of the recuperator are required, these operations are simple and can be carried on with but little delay. Accordingly, in such an installation the furnace operation is carried on practically continuously and overhead charges are thus greatly reduced.

In one form of embodiment of the invention, the installation comprises a pair of furnaces which are placed in proximity, each furnace having an elongated heating chamber into which the fuel is introduced through a burner preferably at one end thereof. Air for combustion enters the furnace chamber near this end and the waste gases, which give off large amounts of heat, are withdrawn from the other end of the chamber. Both furnaces are of similar construction, and the air inlets and gas outlets are connected by suitable ducts to a recuperator, which lies between the furnaces. Air is supplied to this recuperator by suitable means, such as a fan, forcing air into passageways leading through the recuperator, and these passageways are connected to the ducts which lead to the air inlets of the furnaces. Within the recuperator are other passageways leading from the ducts to an outlet connected to a stack, these passageways receiving the hot gases from the furnaces and causing them to flow through the recuperator in heat transfer relationship with the air flowing therethrough in the opposite direction. Valve means are provided by which the ducts leading to one furnace may be closed when that furnace is out of operation, and with this arrangement, the furnaces can be fired alternately, while the recuperator is continuously in operation.

For a better understanding of the invention, reference may be had to the accompanying drawings, in which Fig. 1 is a horizontal sectional view of the furnaces and recuperator forming a single installation, Figs. 2, 3, 4, and 5 are vertical sectional views on the lines 2—2, 3—3, 4—4, and 5—5, respectively of Fig. 1, Fig. 6 is a fragmentary sectional view of a part of the recuperator, and Fig. 7 is a sectional view on the line 7—7 of Fig. 6.

In the installation as illustrated in Fig. 1, there are shown two furnaces, 10 and 11, of similar construction. Each furnace has an elongated heating chamber defined by walls 12 and an arch 13 which may be of standard masonry construction. Within the heating chamber is a floor 14 having a bed of sand 15 forming a hearth upon which the cool metal to be melted is introduced through charging doors 16 in the side walls of the furnace. At one end is an opening 17 for the introduction of a burner 18 and between the forward edge of the hearth and the front wall of the furnace is a vertical duct 19 for the introduction of air for combustion of fuel. This duct delivers the air just below the burner opening, where the air mixes with the fuel issuing from the burner. At the opposite end of the furnace is a duct 20 leading the gases of combustion downwardly into a chamber 21 which extends forwardly beneath the hearth to an outlet opening 22. As shown in Fig. 5, the hearth and arch above it are so arranged that the flame from the burner passes close to the surface of the hearth, so as to get the full heating effect on the metal, and molten metal is tapped through openings 23 in one side wall of the chamber just below the charging doors.

The furnaces are used in pairs in connection with a single recuperative device 23' which has passageways in which the air for combustion in one furnace and the hot gases therefrom are caused to flow in heat transfer relationship. These passages are connected to the furnace chambers by ducts 24 and 25, the duct 24 delivering heated air from the recuperator to the chamber 26 in the bottom part of the furnace chamber at the front thereof, this chamber being in communication with the vertical duct 19 through which the air flows into the heating chamber proper. The hot gases of combustion flow from the furnace chamber downwardly through the outlet duct 20 and through the chamber 21 to outlet 23 which is connected by duct 25 to the gas passages in the recuperator. The recuperator is thus connected by pairs of ducts 24 and 25 to the air inlets and gas outlets respectively of both furnaces, and suitable valves 27 and 28 are provided in the ducts 24 and 25, so that when one or the other of the furnaces is out of operation, the ducts leading to it may be closed from the recuperator. The hot gases which escape from the heating chambers carry considerable quantities of solid material which are largely deposited in the chamber 21, this chamber thus serving to clean the gases to a substantial extent before the gases enter the passages in the recuperator.

The recuperator 23' has the form of an elongated chamber, the walls and top of which are of any suitable masonry construction. At one end of the recuperator is a chamber 29, into which air is forced by a motor-driven fan 30, though in some instances this fan may not be required. Air flows across the chamber 29 and through a bank of tubes 31 to a narrow chamber 32. The chamber 31 extends from the bottom of the recuperator to the top, while the chamber 32 extends only part way up the recuperator, the top of this chamber lying spaced downwardly from the top of the recuperator structure. The air flows through the chamber 32, thence through the tubes of a second bank 33 into a chamber 34 similar to the chamber 29 and wider than the chamber 32, the chamber 34 also extending to the top of the recuperator. The air flows across this chamber, then through a bank of tubes 35 into a small chamber 36, similar to chamber 32, then through another bank of tubes 37 and finally into the air outlet chamber 38, which is connected through openings 39 in the side walls thereof with air ducts 24.

The gases delivered from the furnaces through ducts 25 are led through openings 40 in the side walls of the recuperator into a passage 41 leading upwardly between adjacent walls of the chambers 36 and 38, the gases flowing through the bank of tubes 37 in their movement through passage 41. The passage 41 leads to a horizontal passage 42 at the top of the recuperator through which the gases flow around the top of the chamber 36 into a passage 43, leading downwardly past the bank of tubes 35 into a horizontal passage 44 which leads beneath the bottom of the chamber 34 to an upwardly extending passage 45 in which the gases flow past tubes of the bank 33 to a passage 46 extending over the top of the chamber 32. The gases then flow downwardly through the passage 47 past the tubes of the bank 31 into a horizontal passage 48 leading to a stack 49.

The tubes which connect the adjacent air chambers are heat transfer elements and each tube 50 is preferably made of refractory material, such as carborundum, although the tubes which are exposed to the gases at a relatively low temperature such as those in the banks 31 and 33, may in some cases be made of cast iron. The tubes extend through openings in the adjacent walls of a pair of air chambers, as shown at 51 (Fig. 6) and these walls may be conveniently made of tile construction with the ends of the tubes entering openings in the tile and the ends then being caulked, as indicated at 52, so that the joint is airtight. Each tube contains a "corebuster" 53 supported at the center of the tube on legs 54. This corebuster may be conveniently made as a clay rod made in three sections, the center section being cylindrical, while the end sections have rounded ends 55 to direct the air flow evenly in the annular space between the corebuster and the wall of the tube. By the use of such a corebuster, air flows through each tube in a thin film in contact with the inner walls of the tube, thus improving the rate of heat transfer.

It will be observed that the chambers 29, 34, and 38 are relatively wide, while the chambers 32 and 36 are narrow. Doors or other means of access are provided so that workmen can enter these chambers and the narrow chambers are for inspection purposes, while the wide chambers provide space so that the tubes can be withdrawn into these chambers wherever replacement or repair is required. Openings are also provided through the walls of the recuperator, so that the outside of the tubes can be cleaned by the usual soot blower, and with this construction, it will be evident that examination of the parts of the recuperator is a relatively simple operation which can be carried on in a short time. Likewise, tubes which require replacement are easily removed into the wide chambers and the new tube can be inserted and mounted in position in the wall opening without difficulty. Such inspection and repairs require only a relatively short time, as compared with the length of time required for cleaning and repairing the furnaces.

In the recuperator it will be noted that the air flows in a generally straight line from one end of the recuperator to the other, passing successively through chambers and banks of tubes. During its passage through the banks of tubes, the air is brought into heat transfer relationship with the hot gases which flow past the tubes at right angles to the direction of air flow. Thus short circuiting is eliminated and all parts of the tubes are effective heat transfer areas. The alternate passage of the air which is heated in a succession of stages through tubes and chambers permits the air to mix within the chambers so that all parts of it are heated to a uniform temperature and the gases which flow past the tubes in the manner indicated give up the greater proportion of their heat to the air in the successive stages of the heat transfer action.

A single recuperator of the type described is much more effective than a regenerator chamber containing checker work of the ordinary type. Consequently, much less floor space is occupied by a recuperator than is required for regenerators in which a comparable heat recovery is obtained. Regenerative chambers likewise require attention from time to time, and their construction is such that this attention consumes considerable periods of time. Accordingly, by the use of a single recuperator of the type described with a pair of furnaces, the floor space required for the installation is much reduced and the overhead charges are likewise lessened because the recuperative structure is used practically continuously in connection with one furnace and then with the other.

The new recuperator affords a highly efficient means for the recovery of heat otherwise lost, not only because of the effective heat transfer through the tube walls separating the air and hot gases, but in addition, owing to the material of which these tubes are formed, the tubes may be rapidly raised in temperature to that at which efficient operation occurs. Consequently, if a furnace has to be shut down during its firing period, as, for example, for a part of each day, then by closing the recuperator openings, heat can be stored in the tubes so that a relatively short period of time is required after furnace firing is again commenced to bring these tubes to the proper temperature for efficient heat recovery.

I claim:

1. A furnace installation comprising a pair of furnaces, each comprising an elongated combustion chamber having a burner at one end, an air inlet adjacent this end, and an outlet for gases at the end remote therefrom, these furnace chambers lying side-by-side, a recuperator lying between the furnaces with its axis parallel thereto, containing separate passageways for air and gases arranged to cause the air and gases to simutaneously flow in heat transfer relationship, ducts connecting the air inlets and gas outlets of both furnaces to the air and gas passageways of the recuperator, the ducts from each furnace leading to the same end of the recuperator at opposite sides thereof, said ducts having diameters of the same order of magnitude as their length, an air inlet and a gas outlet at the opposite end of the recuperator, and means in the ducts for shutting off the furnace out of operation from the recuperator.

2. A furnace installation which comprises the combination of a pair of furnaces adapted to be fired in alteration, each furnace having means for admitting fuel, an air inlet and an outlet for hot gases, a recuperator lying between the furnaces and having separate passageways for air and for hot gases, these passageways being connected at one end of the recuperator by short ducts having diameters substantially equal to their lengths leading to the air inlets and gas outlets of the furnaces, and the passageways being arranged to cause the air and hot gases simultaneously flowing in opposite directions through the recuperator to pass in heat transfer relationship in successive stages, an air inlet and a gas outlet at the end of the recuperator opposite to that to which the ducts lead, and means in the ducts for shutting off the furnace which is out of operation from the recuperator whereby air is preheated before entering the furnace in operation.

3. A pair of reverberatory furnaces arranged in spaced parallel relation for firing in like directions, each furnace containing an upper combustion chamber into which the fuel and preheated air are directed, a vertically disposed intermediate chamber into which the combustion and waste gases pass in a vertically downward direction, and a lower chamber in which said gases pass in a direction opposite to the firing direction to a point adjacent the firing end, a recuperator placed between said furnaces and extending the major portion of their length, a short air duct of large cross-section from the recuperator to the fuel inlet of each furnace and a similar waste gas duct from each furnace to the recuperator adjacent said air duct.

4. The pair of reverberatory furnaces in claim 3 in which the recuperator has alternate large and small air chambers connected by tubes of silicon carbide, and passageways for waste gases around the tubes through which the gases pass alternately upwardly and downwardly past said conducting tubes.

5. The pair of reverberatory furnaces in claim 3 in which the air to be preheated passes through the recuperator in alternately mixed and distributed condition whereby the preheated air is freed from dust and brought to a uniform temperature, said recuperator containing tubes of silicon carbide for interchange of heat between waste gases and air, and corebusters in each of said tubes to keep the flowing air in thermal contact with the inner surfaces of the tubes.

6. In combination with a pair of furnaces adapted to be fired in alternation, a recuperator lying adjacent both furnaces, ducts between each furnace and the recuperator for preheated air and waste gases, said ducts having diameters of the same order of magnitude as the distances between said recuperator and either furnace, passages in the recuperator for the preheated air comprising separate mixing chambers and short lengths of silicon carbide tubes connecting said mixing chambers, connections between said air passages and said air ducts, other passages in said recuperator for the waste gases leading over said tubes in alternately reversing directions, connections between said waste gas passages and said waste gas ducts, and means in said ducts for connecting either furnace to the recuperator.

7. A pair of reverberatory furnaces arranged in spaced parallel relation for firing in like directions, each furnace containing a horizontally disposed upper combustion chamber, firing means for introducing fuel and preheated air in mixed condition in one end of each furnace, a vertically disposed intermediate chamber located at the end of each furnace opposite the firing end into which the waste gases pass in a downward direction, a horizontally disposed lower chamber beneath each upper chamber in which the waste gases flow from said intermediate chamber in a direction opposite to the firing direction, a horizontally disposed recuperator mounted between said furnaces and immediately adjacent thereto, said recuperator having uniflow horizontal air passages and alternately reversing gas passages leading over said air passages, air blast means connected to the ends of the recuperator air passages remote from the firing ends of said furnaces, a short air duct of large cross-sectional area connecting the other ends of said recuperator air passages to said firing means at the firing end of each furnace, and a short waste gas duct of large cross-sectional area connecting said recuperator waste gas passages to each of said lower waste gas chambers at a point adjacent the firing end of each furnace, said air and waste gas ducts being located adjacent the firing ends of each furnace remote from said recuperator air blast means.

In testimony whereof I affix my signature.

WILLIAM H. FITCH.